United States Patent [19]
Nielsen

[11] Patent Number: 4,724,297
[45] Date of Patent: Feb. 9, 1988

[54] METHODS IN THE LASER CUTTING OF METALLIC WORKPIECES

[75] Inventor: Steen E. Nielsen, Skavinge, Denmark
[73] Assignee: AGA Aktiebolag, Lidingo, Sweden
[21] Appl. No.: 872,576
[22] Filed: Jun. 10, 1986
[51] Int. Cl.$^4$ .............................................. B23K 26/00
[52] U.S. Cl. ...................... 219/121 LG; 219/121 LN; 219/121 FS
[58] Field of Search .................. 219/121 FS, 121 LG, 219/121 LN

[56] References Cited

U.S. PATENT DOCUMENTS 4,467,171 8/1984 Ramos .......................... 219/121 LG

FOREIGN PATENT DOCUMENTS 1903325 8/1969 Fed. Rep. of Germany .
0131543 10/1979 Japan ............................ 219/121 FS
0130391 10/1980 Japan ............................ 219/121 LG
1250610 10/1971 United Kingdom .

OTHER PUBLICATIONS

M. J. Adams, "Introduction to Gas Jet Laser Cutting", *Metal Construction and British Welding Journal*, Jan. 1970, pp. 1–7.

Primary Examiner—C. L. Albritton
Attorney, Agent, or Firm—Pollock, Vande Sande & Priddy

[57] ABSTRACT

In laser cutting of metallic workpieces, for avoiding burr and slag formation in the kerf, providing good weldability and high cutting speed in the workpiece, use is made of a cutting gas which comprises at least one active gas, such as for example, oxygen. The cutting gas is mixed with at least one substantially inert gas, such as for example, He, $N_2$, Ar, of $CO_2$, a gas or gas mixture which has but slight reactive tendencies with the material in the workpiece, the oxygen concentration lying in the range of about 30% to about 90% of the total cutting gas content.

4 Claims, 3 Drawing Figures

METHODS IN THE LASER CUTTING OF METALLIC WORKPIECES

TECHNICAL FIELD

The present invention relates to a method, in the laser cutting of metallic workpieces, for avoiding burr and slag formation in the kerf and for realizing good weldability and, at the same time, permitting high cutting speed in the workpiece, a cutting gas including at least one active gas such as, for example, oxygen,

BACKGROUND ART

As is well-known in the metalworking Art, laser cutting is normally performed by focusing a laser beam on the metallic workpiece which is to be cut. At the same time, a cutting gas, normally oxygen, is blown onto the workpiece through a nozzle. The principle of laser cutting equipment will be apparent from a subsequently presented description of Drawings appended to this application. A laser beam from, for example, a $CO_2$ laser is focussed by a lens through a nozzle device onto a workpiece, for example a metal sheet. The cutting gas, oxygen, is led through an intake conduit to a plenum chamber and is forced coaxially with the laser beam through a nozzle mouth out towards the workpiece. The nozzle device is disposed in a support member in which bearing balls are journalled, against which the workpiece—the metal sheet—abuts. A support member is disposed against the underface of the metal sheet and is provided with a hole under the nozzle device. The metal sheet moves, during the cutting operation, in a given direction and may, during this movement, be mounted on, for example, a mobile co-ordinate cutting table.

The purpose of the cutting gas—the oxygen—is twofold: (a) to protect the lens 2 in the cutting equipment from the spatter and slag created during the cutting process, and (b) to flush out molten material and slag from the kerf which is formed as a result of the cutting operation. In this operation, the molten material and slag 12 are flushed out through the hole 10 in the support member 9. If the sheet 6 is of carbon steel or of stainless steel, the oxygen has a further purpose to fulfil, namely to react chemically with the steel and thereby generate heat, which facilitates the cutting process. Thus, apart from melting of the sheet by the action of the laser beam, laser cutting also entails a steel combustion of the type which occurs in traditional gas cutting.

In the prior art a cutting gas has been used which consists of up to 100% oxygen, since such a cutting gas gives the best results with respect to attainable cutting speeds and acceptable kerf qualities. The quality contemplated here is dependant upon several parameters among which are cutting speed, cutting gas pressure (i.e. the gas pressure in the nozzle), nozzle diameter (i.e. the hole diameter in the nozzle mouth), nozzle spacing (i.e. the distance between the nozzle mouth and workpiece) and finally laser output. In general terms, the increased cutting gas pressure gives increased cutting speed. However, the cutting gas pressure must be limited in view of such factors as the use of focussing lens. Laser cutting with pure oxygen as the cutting gas involves, however, certain drawbacks, in particular in conjunction with the cutting of stainless steel. Oxides are formed during the melting of the material in the workpiece. These oxides, together with molten material, are blown out through the kerf. A portion of the oxides and the molten material is, however, deposited as burrs on the underside of the kerf. These burrs may, in particular in high-alloy steel, be difficult to remove. In cutting with pure oxygen as the cutting gas, the melted zone will be mixed with slag, i.e. a mixture of oxides from the workpiece. The slag flakes in the kerf may give rise to problems in subsequent welding. A metal sheet which is cut with pure oxygen as the cutting gas may, thus, give a welding joint which contains slag pockets which may be difficult to remove. One method of avoiding the difficulties inherent in oxide formation and consequential burr and slag formation would be to replace the oxygen in the cutting gas by an inert gas. However, this would result in a decline of the cutting speed to a very low rate. Hence, such a process is beset with serious disadvantages.

OBJECT OF THE INVENTION

The object of the present invention is to provide a method above-outlined disadvantages and drawbacks in the method according to the present invention the cutting gas, which includes at least one active gas such as oxygen, is mixed with at least one substantially inert gas such as, for example, He, $N_2$, Ar, $CO_2$, i.e. a gas or a gas mixture which has but slight reactive tendencies with the material in the workpiece; and that the oxygen concentration lies in the range of between 30 and 90% of the total cutting gas content.

BRIEF DESCRIPTION OF THE ACCOMPANYING DRAWINGS

The nature of the present invention and its aspects will be more readily understood from the following brief description of the accompanying drawings, and discussion relating thereto.

In the accompanying drawings:

FIG. 1 illustrates the principle of laser cutting equipment; and

FIGS. 2 and 3 diagramatically illustrate the cutting speed as a function of the oxygen concentration in the cutting gas in a typical cutting gas mixture.

DESCRIPTION OF PREFERRED EMBODIMENT

Figure 1:
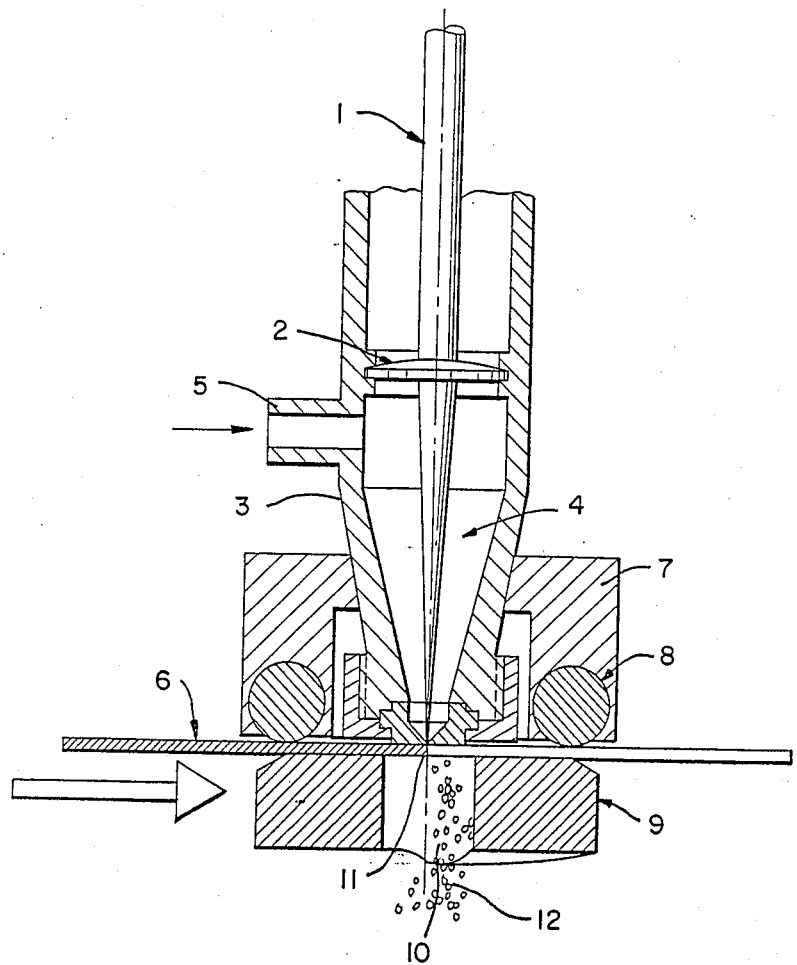

The embodiment according to FIG. 1 will now be described with reference to FIG. 1 which shows laser beam 1, nozzle device 3, workpiece 6, intake conduit 5, plenum chamber 4, nozzle mouth 11, bearing balls 8, support members 7, 9, hole 10, arrow 13. The cutting gas containing oxygen mixed with an inert gas is led through the intake conduit 5 to the plenum chamber 4. In experiments, He, $N_2$, Ar and $CO_2$ have been employed as the inert additional gases. In order to attain the best possible result with respect to cutting speed and kerf quality, it is essential that suitable values be selected of the siting of the lens, of the diameter of the nozzle mouth and of the distance between the nozzle mouth and the workpiece. Furthermore, a suitable cutting gas pressure should be employed in the nozzle and a suitable mixture of active and inert gases be employed in the cutting gas. In a $CO_2$ laser, an output of more than 400 W should be employed. The size of the nozzle diameter may be in the range of between 0.8 and 1.2 mm and the nozzle spacing in the range of between 0.25 and 0.60 mm. The cutting gas pressure in the nozzle should lie in the range of between 2 and 5 bar. With special nozzles, a higher cutting gas pressure may be employed, in which cases the pressure may exceed 7 bar.

The cutting gas mixture, i.e. the mixture of oxygen and an inert gas should, as has been mentioned above, be such that the oxygen concentration lies in the range of between 30 and 90% of the total cutting gas content. If one of the inert gases He, $N_2$, Ar or $CO_2$ is employed, the oxygen concentration, on cutting of high-alloy and stainless steel, should lie in the range of between 40 and 80% of the total cutting gas content. If He is selected as the inert gas, the oxygen concentration should lie in the range of between 45 and 75% of the total cutting gas content. If any of the other above-mentioned gases, $N_2$, Ar or $CO_2$ is selected as inert gas, the oxygen concentration should lie in the range of between 40 and 70% of the total cutting gas content.

Cutting experiments have been carried out on workpieces in the form of sheets of different thicknesses and of unalloyed and high-alloy (eg. stainless steel) materials. The experiments were carried out at different nozzle distances, the best cutting result being obtained at as small nozzle distances as possible. As a practical reference, 0.3 mm might be mentioned. As a practical reference for the hole in the nozzle mouth, a diameter of 0.8 mm may be given. In the experiments, the cutting speed, gas pressure and lens siting were varied for each sheet thickness and cutting gas mixture, so as to make for determination of the best cutting conditions.

Figure 2:
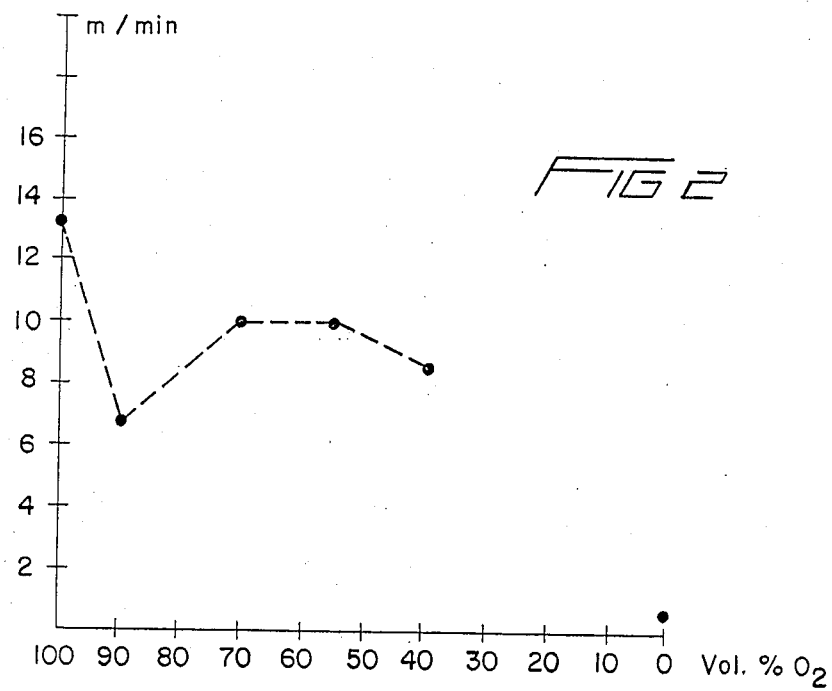
Figure 3:
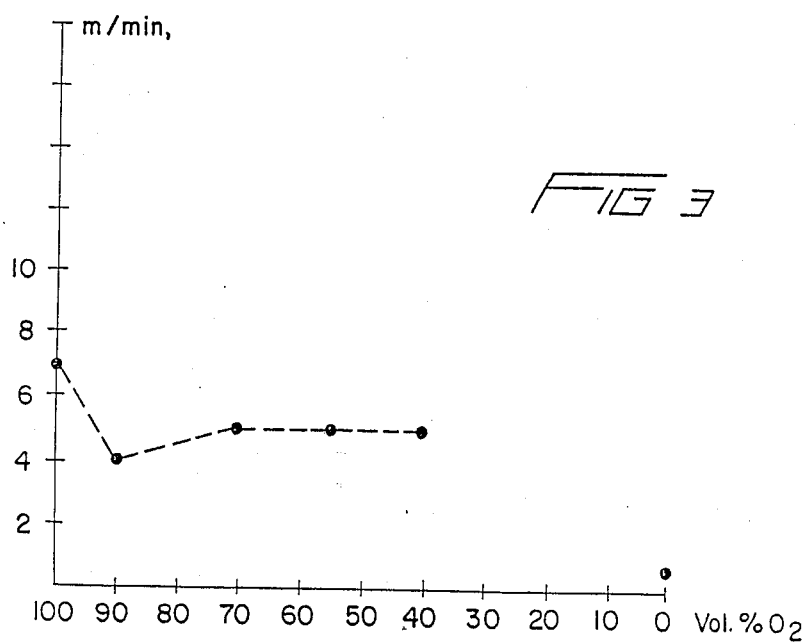

The experiments show that, in general, the cutting speed falls when the oxygen content in the cutting gas is reduced. In each respective experiment, the highest cutting speed at the best possible kerf quality has been determined for cutting gas mixtures consisting of oxygen mixed with He, $N_2$, Ar and $CO_2$. Primarily, it is the size of the burrs in the kerf which are decisive in an assessment of the kerf quality. FIGS. 2 and 3 show the cutting speed as a function of the oxygen concentration in the cutting gas, the cutting gas having been mixed with He. FIG. 2 shows these relationships in the cutting of stainless steel sheet of 0.5 mm thickness and FIG. 3 in the cutting of stainless sheet of 1.0 mm thickness. These curves show typical examples of the relationship between cutting speed, oxygen concentration and kerf quality. Curves of a similar appearance are obtained for the other gases mentioned above.

It will be apparent to the skilled reader of FIGS. 2 and 3 that the cutting speed curve has a nadir at an oxygen content of 90%, and that the curve thereafter rises following the reduced oxygen concentration. In a Helium mixture in the cutting gas, a maximum cutting speed is obtained in an oxygen concentration in the range of of between 45 and 75%. On FIGS. 2 and 3, the cutting speed in 100% He mixture has also been plotted out. Here, the cutting speed is only about 0.5 m/min., a figure which is wholly unacceptable. This emphasises the importance of the presence of oxygen in the cutting gas for the laser cutting process. As far as kerf quality is concerned, a marked improvement is obtained, in particular for stainless steel material, in the use of a mixed gas as cutting gas. This is because a burr is created on the under edge of the kerf when pure oxygen is employed in the cutting operation. This burr may be difficult to remove. This also applies to gas mixtures with oxygen content in the range of from 90 to 100%. The range of from 80 to 90% is a transitional region, in which the burr begins to assume the form of swanshot. This becomes even more manifest in oxygen contents of less than 70%. Here, the burrs are in the form of swanshot along the kerf—swanshot which may readily be removed using, for example, a brush. Hence, this improvement of the kerf quality is a reflection of the previously-mentioned increase of the cutting speed.

It has been possible to establish a further improvement of the kerf quality in the employment of a mixed gas as the cutting gas by metallurgical examinations carried out using electron microscopy. In cutting employing a mixed gas, it has been found that the melted zone in the kerf will be smaller and that the zone contains no embedded slag flakes. In subsequent welding of, for example, a stainless steel sheet, a blank, smooth surface is imparted to the weld seam when mixed gas had been employed as the cutting gas.

By using a cutting gas in laser cutting which consists of a mixed gas consisting of an active gas, oxygen, and an inert gas such as He, $N_2$, Ar or $CO_2$, in which the oxygen concentration is in the range of between 30 and 90% of the total cutting gas content, the cutting can be carried out in both unalloyed and high-alloy workpieces under acceptable conditions. While a slower cutting speed is achieved, a better kerf quality will be obtained. By the method according to the present invention, a kerf will be obtained in which burrs are either wholly absent or may very simply be removed. Nor do any slag pockets occur on the kerf surface, which is of considerable advantage in a subsequent welding operation.

What we claim and desire to secure by Letters Patent is:

1. A method, of laser cutting of metallic workpiece made of high alloy or stainless material, comprising
   supplying a cutting gas which comprises oxygen as one active gas,
   mixing said cutting gas with at least one substantially inert gas such as He, Ar or $CO_2$, to the oxygen concentration between about 40% to about 80% of the total cutting gas mixture content,
   cutting said metallic workpiece with said cutting gas mixture at a relatively high cutting speed with substantial elimination of burr whereby permitting good weldability qualities of said metallic workpiece.

2. A method as claimed in claim 1 wherein said inert gas is He and the oxygen concentration is in the range of about 45 to about 75% of the total cutting gas mixture content.

3. A method as claimed in claim 1 wherein said inert gas is Ar and the oxygen concentration is in the range of about 40 to about 70% of the total cutting gas mixture content.

4. A method as claimed in claim 1 wherein said inert gas is $CO_2$ and the oxygen concentration is in the range of about 40 to about 70% of the total cutting gas mixture content.

* * * * *